United States Patent [19]

Fletcher

[11] Patent Number: 5,142,499
[45] Date of Patent: Aug. 25, 1992

[54] METHOD AND APPARATUS FOR SHALLOW WATER SEISMIC OPERATIONS

[76] Inventor: Gerald L. Fletcher, Box 6, KBYCL Jakarta, Indonesia, 12340

[21] Appl. No.: 660,725

[22] Filed: Feb. 25, 1991

[51] Int. Cl.$^5$ ............................................. G01V 1/38
[52] U.S. Cl. ...................................... 367/20; 367/154; 367/178; 181/401
[58] Field of Search ................ 367/20, 153, 154, 155, 367/177, 178, 180, 188; 181/122, 401

[56] References Cited

U.S. PATENT DOCUMENTS

| | | | |
|---|---|---|---|
| 2,780,301 | 2/1957 | Jakosky | 367/153 |
| 3,921,755 | 1/1975 | Thigpen | 367/177 X |
| 4,078,223 | 3/1978 | Strange | 367/178 |
| 4,092,628 | 5/1978 | Hall, Jr. | 367/178 |
| 4,398,276 | 8/1983 | Kruppenbach | 367/177 |
| 4,516,227 | 5/1985 | Wener et al. | 367/15 |
| 4,838,379 | 6/1989 | Maxwell | 181/122 |
| 4,870,625 | 9/1989 | Young | 367/16 |
| 5,007,031 | 4/1991 | Erich, Jr. | 367/178 |
| 5,014,813 | 5/1991 | Fussell | 181/122 |

*Primary Examiner*—Brian S. Steinberger
*Attorney, Agent, or Firm*—John E. Reilly

[57] ABSTRACT

A seismic receiver array device for shallow water and near-shore operations which is comprised of an elongated low-profile, flexible casing having a plurality of geophones and hydrophones spaced along its length, and the geophones and hydrophones are electrically connected to a transmitter for transmitting the seismic impulses into a master receiver. Spikes are extended downwardly at spaced intervals along the length of the casing and a setting tool is provided to releasably anchor the spikes into the earth below a body of water.

12 Claims, 2 Drawing Sheets

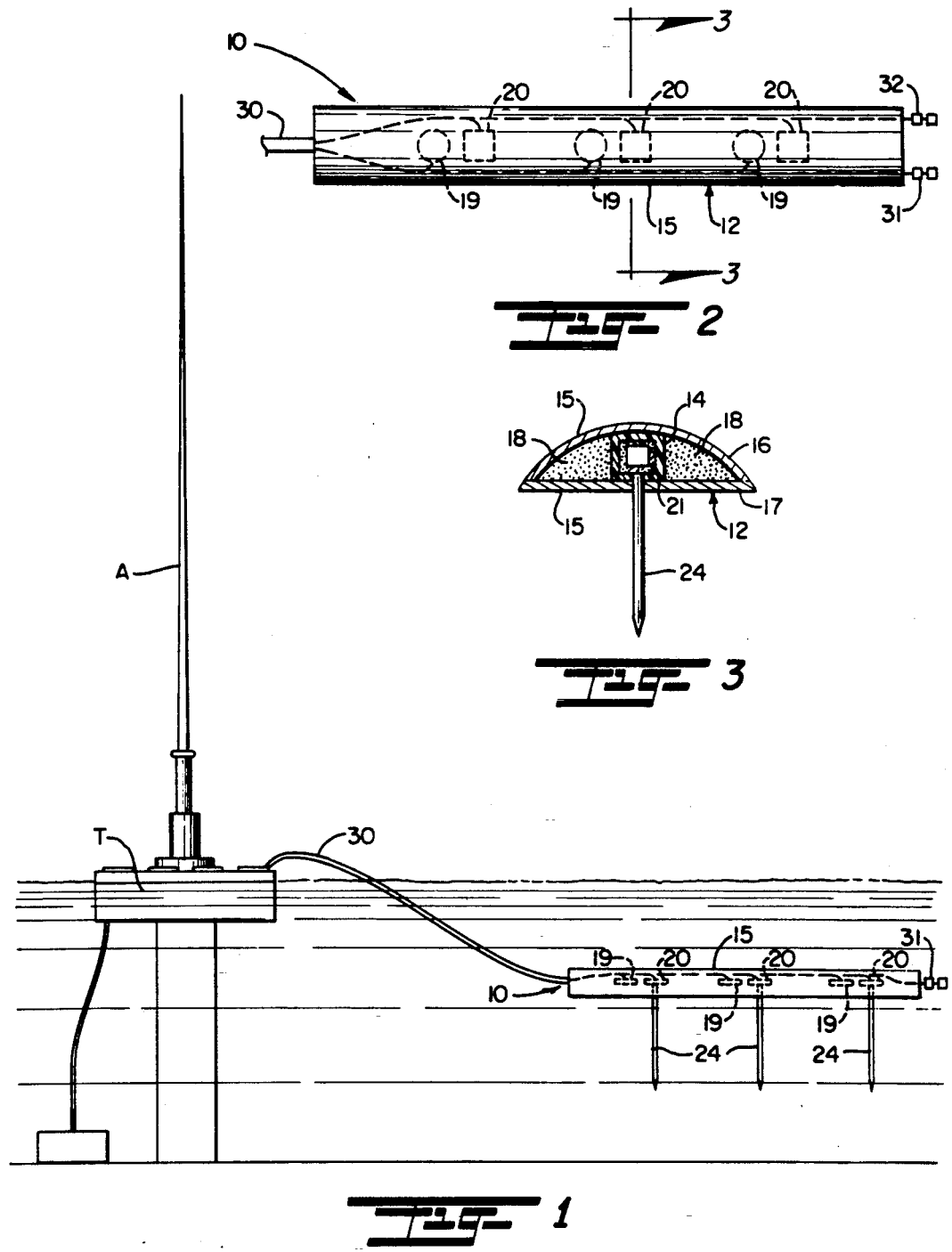

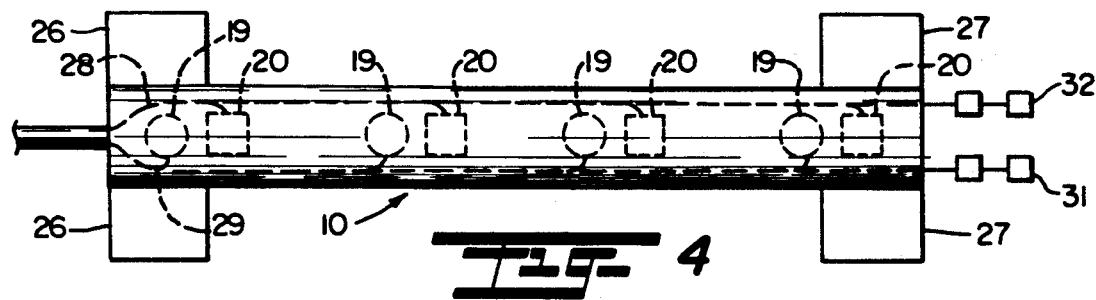
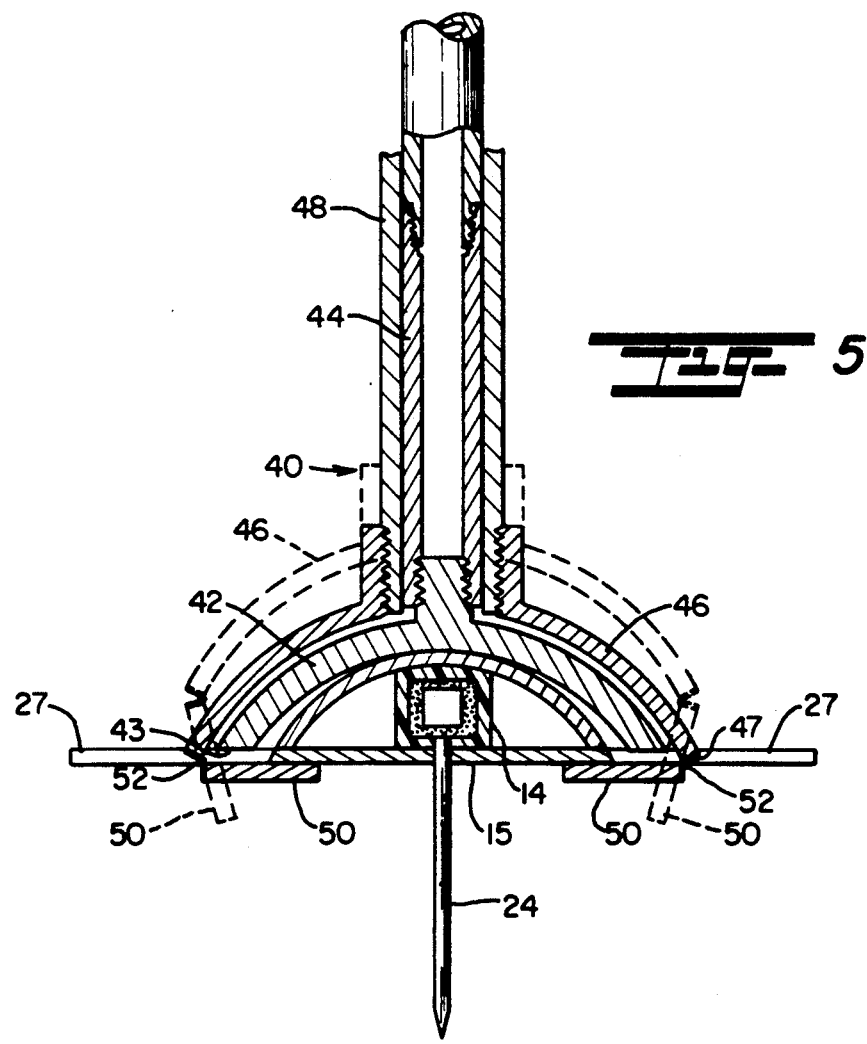

METHOD AND APPARATUS FOR SHALLOW WATER SEISMIC OPERATIONS

This invention relates to geophysical prospecting apparatus; and more particularly relates to a novel and improved method and apparatus for conducting near-shore seismic operations and particularly in shallow water areas.

BACKGROUND AND FIELD OF INVENTION

In conducting seismic operations in shallow water or near-shore areas, there is a need for a receiver array device which is capable of accurately sensing or responding to seismic vibrations without being unduly affected by water current noise and other noises common to shallow water conditions and tidal zones. In the past, emphasis has been placed upon the use of one or more hydrophones which generally have exhibited poor signal-to-noise ratios to the extent that in severe operating conditions, operations must be suspended for long periods. Geophones have not been used extensively in shallow water areas, since a firm anchor must be established in solid contact with the earth beneath the water in order to accurately sense seismic vibrations. Because of the difficulty of anchoring and setting geophones in place, they have not been used in shallow water seismic operations. Furthermore, in the past, there has been no system which integrated the hydrophone and geophone receivers in the same or common unit or body.

It is therefore desirable to provide for a single seismic receiver array device which can be deployed in near-shore and/or onshore areas and effectively advanced over wide areas to sense seismic impulses and transmit same to a transmitter with maximum efficiency and optimum signal-to-noise ratios. In this connection, the device should either be capable of operating while suspended in water or anchored to the earth or floor beneath the water, but in either mode be stable against undue shifting or twisting in the current and present in any of receivers which are deployed in a spatial configuration so as to produce an optimum signal-to-noise ratio whether through the utilization of a series of hydrophones or geophones or a combination of both. Further, it is important that the device be readily transportable to different locations and therefore should be of compact but durable construction as well as being modular to permit several receiver array devices to be interconnected to produce optimum sensitivity under different conditions of use.

SUMMARY OF INVENTION

It is therefore an object of the present invention to provide for a novel and improved method and apparatus for carrying out seismic operations and which is specifically adaptable for use in near-shore shallow water seismic exploration activities and particularly in harsh current and surf zone environments.

It is another object of the present invention to provide for a novel and improved seismic receiver array device which is of compact, rugged construction and can either be operated by suspending in the water or by setting in the earth beneath the water and/or on land; and to this end a novel and improved setting tool is provided for use in combination with the receiver array device to firmly anchor it in a desired underwater location.

A further object of the present invention is to provide for a novel and improved seismic receiver array device for near-shore seismic operations which is readily transportable to different intended locations and which is capable of employing a series of hydrophones, geophones or a combination of same in carrying out seismic operations and to transmit seismic signals to a recording device.

A still further object of the present invention is to provide for a low-profile, compact seismic receiver array device which is of flexible but durable construction and can be readily utilized under harsh current conditions and surf zone environments as well as a wide range of water depths.

An additional object of the present invention is to provide for a novel and improved method and apparatus for carrying out near-shore, shallow water seismic operations in which the device is easy to transport and use under variable conditions of use; and further wherein a streamlined flexible casing is employed as a housing for a series of hydrophones and geophones thereby providing a multiplicity of receivers in a single device so that efficient noise attenuation can be achieved.

In accordance with the present invention, a preferred form of seismic receiver array device for shallow water, near-shore operations is comprised of an elongated flexible casing having a plurality of geophones along with hydrophones in pairs spaced along its length, neutrally or slightly negative buoyant support means forming a part of the casing, and downwardly extending earth-penetrating geophone spikes spaced along the length of the casing for overcoming the buoyancy of the casing and anchoring the geophones into the earth beneath the water where applicable. The geophones are electrically connected to a transmitter for directing the seismic impulses or vibrations sensed into the master receiver.

A plurality of hydrophones along with geophones in pairs are disposed at spaced intervals along the length of the casing and similarly connected to a transmitter for transmission or recording of seismic impulses sensed when the device is immersed in water of more than 2 meter depth. When the device is anchored to the bottom by the geophone spikes, both geophones and hydrophones transmit seismic signals. However, where the device is suspended in water due to excessive water depth or other conditions, only the hydrophones are operative. Similarly, on land or in very shallow water conditions less than 2 meters in depth, only the geophones will be operative to transmit a signal. In order to facilitate anchoring of the earth-penetrating members, a setting tool includes a rigid convex foot engageable with the casing and upwardly extending telescoping or threaded members to force the cover and engaged casing downwardly until the earth-penetrating members become firmly anchored. The degree of buoyancy of the receiver array is preferably controlled by a fluid or gel-like substance disposed in the casing, and the casing itself has an upwardly convex cross-section, a flexible underside with a fluid or gel-like substance filling the interior of the casing in surrounding relation to an array of hydrophone and geophone receivers. In certain applications, stability may be afforded through the utilization of extension wings at opposite ends of the casing and which extend in lateral directions beyond the opposite side portions.

A major feature of the proposed seismic system is to provide a receiver array device which is sufficiently flexible in operation to operate in a wide range of near-shore, shallow water environments and conditions. It is specifically designed to overcome some of the noise problems which inhibit operations within tidal and excessive current areas. The unique integration of geophones and hydrophones into a single receiving device provides maximum flexibility and efficiency of operations and promotes enhancement of the signal-to-noise ratios in harsh environments of near-shore transition zones.

The above and other objects, advantages and features of the present invention will become more readily appreciated from a consideration of the following detailed description of a preferred embodiment thereof, when taken together with the accompanying drawings, in which:

BRIEF DESCRIPTION OF THE DRAWINGS

FIG. 1 is a view in elevation illustrating the preferred form of receiver array device suspended in the water and further shown in dotted form when anchored beneath the water;

FIG. 2 is an enlarged plan view of the preferred form of receiver array device shown in FIG. 1;

FIG. 3 is a cross-sectional view taken through a geophone about lines 3—3 of FIG. 2;

FIG. 4 is a plan view of a modified form of receiver array device in accordance with the present invention; and FIG. 5 is a cross-sectional view of a preferred form of setting tool used in association with either form of receiver array device shown in FIGS. 1 to 4.

DETAILED DESCRIPTION OF THE PREFERRED EMBODIMENT

Referring in detail to the drawings, a preferred form of seismic receiver array device 10 is illustrated in FIGS. 1 to 4 and is broadly comprised of a low-profile, upwardly convex elongated casing 12 have a hollow central body portion 14, a laterally extending underside in the form of a flexible heavy plastic sole 15 and upper arch-like cross-sectional supports 16 which curve downwardly and merges with the casing sole 15 to terminate in opposite side edges 17 at opposite lateral outer edges of the sole 15. The cross-sectional supports 16 maintain the convex upward profile of the casing and secures the geophones 20 rigidly in place in the casing. The supports are only present at longitudinally spaced intervals where the geophones 20 are placed along the casing. The casing 12 forms with the sole 15 a sealed enclosure for fluid or a gel-like substance 18 and which substance is of a consistency or density to lend buoyance if necessary to the entire casing unit. A plurality of geophones 20 are disposed at longitudinally spaced intervals within the body 14, and held by the supports 16 at spaced intervals along the casing wall 12 and sole 15. Hydrophones 19 are disposed at longitudinally spaced intervals but are staggered with respect to the geophones 20 along the casing and are surrounded by the fluid or gel which fills the body cavity 14.

In order to facilitate direct connection of the casing sole 15 to the earth, a plurality of earth penetrating members in the forms of spikes 24 extend downwardly from the geophone casing through the bottom of the casing sole 15 and are permanently affixed thereto. The spikes 24 are of elongated rigid construction and may be of any desired length and construction to firmly anchor the casing and geophones to the earth at the bottom of the body of water where applicable. Typically, such spikes would have a slightly fluted profile which promotes ease of insertion into the earth but anchors the casing securely in the harsh operating environments or soft bottom conditions. Extraction is accomplished by exerting a pulling force on the tether lead or cable 30 to the casing. Electrical cables 28 extend from the geophones 20, and electrically conductive cables 29 extend from the hydrophones 19, the cables 28 and 29 extending through an umbilical cord or cable 30 into a conventional transmitter T having an antenna A for sending data to recording instruments, not shown. One suitable form of transmitter is that illustrated and described in U.S. Pat. No. 4,704,584 in which a portable seismic telemetry buoy has a dual channel sensor input and is capable of being connected to the geophone and hydrophone cables 28 and 29.

It should be noted that the cables 28 and 29 have opposite connector ends 31 and 32, respectively, for connection to an additional casing 10 so that one or more casings may be arranged in end-to-end relation to provide additional sets of geophones 20 and hydrophones 19. Additional hydrophone or geophone receivers will result in better noise attenuation and thus better signal-to-noise ratios. Moreover, certain types of noise (long wavelengths) require longer receiver arrays to attenuate their affects. Accordingly, additional receivers are connected in series so that the signals from the receivers are summed and fed into the same transmitter.

Another form of receiver array unit 10' is illustrated in FIG. 4 in which like parts are correspondingly enumerated to that of FIGS. 1 and 2. In this form, while the basic casing construction is identical to that of FIG. 1, extension wings 26 and 27 are provided at opposite ends of the casing for added stability. The base or casing sole 15 and upper casing wall 16 are of uniform cross-sectional configuration throughout the length of the unit 10', except across the extension wings 26 and 27 which are of relatively thin cross-section compared to that of the central cross-section of the casing. In a manner corresponding to that described with reference to FIGS. 1 to 3, the cables 28 and 29 include connector ends 31 and 32 for addition of one or more casings 10' in series.

The preferred and modified forms of seismic device 10 and 10' are primarily intended for use in shallow waters so that, notwithstanding their slight buoyancy, they can be anchored into the earth or solid floor beneath the body of water. To this end, as shown in FIG. 5, a setting tool 40 is provided for forcing the spikes 24 into the earth and includes an inner cap 42 of generally concavo-convex configuration which generally conforms to the cross-sectional shape of the upper curved surface portion of the casing and terminates in lower edges 43. An inner pole 44 extends upwardly from the inner cap and is rigidly connected to the cap 42. In turn, an outer cap or cover 46 is superimposed on the inner cap 42 and terminates in lower outside edges 47 which extend downwardly a limited distance beyond the lower edges 43 of the cap 42. A hollow pole 48 is rigidly fixed to the outer cap 46 and extends upwardly from the cap 46 and is slidable down over inner pole 44. Claws or fingers 50 are pivotally connected to the lower edges 47 of the outer cover and are biased toward one another by spring members 52 to normally retain the cap 46 snugly against the inner cap 42 with the fingers 50 engaging the underside of the base 15.

The setting tool is assembled as described in connected relation to the casing. By pressing the setting tool 40, and specifically the outer pole 48 downwardly, the spikes 24 will penetrate the earth with sufficient clearance for the fingers 52 to pivot outwardly. Once the spikes are set, the outer pole 48 is drawn upwardly relative to the inner pole 44 causing the fingers 52 to diverge away from the casing sole 15 into a nearly vertical disposition so as to disengage the fingers 52 and the setting tool 40 then can be drawn upwardly with the inner pole until it is clear of the receiving array device 10. The concept is that the inner pole is the controlling member. The outer sleeve member only serves to manipulate the fingers 52.

It will be evident that a single setting tool with a cap 42 length of 1' to 2' can be employed and which is positioned above the first spike and successively advanced to anchor each successive spike along the receiving array device 10. In the alternative, a single setting tool assembly with a much longer cap 42 length (possibly 1 to 2 meters) with a series of claws or fingers at spaced longitudinal intervals along the outer edges 47 can be utilized and operated synchronously to anchor the spikes into the earth followed by removal of the assembly.

Accordingly, it is to be understood that while a preferred form of invention has been set forth and described herein, various modifications and changes may be made without departing from the spirit and scope thereof as defined by the appended claims.

I claim:

1. A seismic receiver array device adapted for placement and use interchangeably in a body of water and on land comprising:
   an elongated flexible casing having a plurality of hydrophones and a plurality of geophones disposed at spaced intervals along the length of and within said casing;
   means in said casing for regulating the buoyancy of said casing in the water; and
   downwardly extending earth-penetrating means at spaced intervals along the length of said casing for anchoring said casing into said earth, and setting means engageable with said casing for forcing said earth-penetrating means into the earth.

2. A seismic receiver array device according to claim 1, said setting means including a rigid cap engageable with said casing and an upwardly extending elongated member connected to said cap.

3. A seismic receiver array device according to claim 2, said setting means including releasable retainer means to releasably retain said cap on said casing.

4. A seismic receiver array device according to claim 3, said releasable retainer means including fingers pivotally connected to said cap and bias means yieldingly urging said fingers toward one another beneath said casing.

5. A seismic receiver array device according to claim 1, said casing having a plurality of upwardly convex support portions at spaced intervals along its length, and a horizontally extending base portion connected along opposed lateral edges with opposed lateral edges of said support portions.

6. A seismic receiver array device according to claim 5, said support portions having outer curved sidewalls extending downwardly and joined to opposed lateral edges of said base portion.

7. A seismic receiver array according to claim 6, said geophones connected to said support portions centrally of said casing, and said hydrophones disposed at spaced intervals along said casing between said geophones.

8. A seismic receiver array device according to claim 1, said buoyancy-regulating means including one of a fluid and gel-like substance in surrounding relation to said geophones and said hydrophones.

9. A seismic receiver array device according to claim 1, said hydrophones disposed in said casing in staggered relation to said geophones and said hydrophones.

10. A seismic receiver array device according to claim 1, said earth-penetrating means defined by a plurality of elongated geophone spikes extending downwardly from said central body portion.

11. A seismic receiver array device according to claim 1, including lateral extension wings at spaced intervals along opposite sides of said casing.

12. A seismic receiver array device including a casing, a setting tool having an inner cap of generally concavo-convex configuration disposed on said casing, a first inner pole extending upwardly from said inner cap, an outer cap superimposed on said inner cap including a lower edge and releasable finger members pivotally connected to said lower edge, resilient means normally retaining said outer cap snugly against said inner cap with said fingers engaging an underside of said casing, and finger control means including an outer hollow pole extending upwardly from said outer cap in surrounding relation to said inner pole, said control means movable in an upward direction to overcome said resilient means and to release said finger members from engagement with said casing and to advance said finger members into engagement with said inner cap.

* * * * *